United States Patent
Kuppuswamy (10) Patent No.: US 12,463,801 B2
(45) Date of Patent: Nov. 4, 2025

(54) SYSTEMS AND METHODS FOR SECURE CLUSTER COMMUNICATION

(71) Applicant: Dell Products L.P., Round Rock, TX (US)

(72) Inventor: Sridharan Kuppuswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 18/295,328

(22) Filed: Apr. 4, 2023

(65) Prior Publication Data

US 2024/0340174 A1    Oct. 10, 2024

(51) Int. Cl.
*H04L 9/08* (2006.01)
*H04L 9/40* (2022.01)
*H04W 12/041* (2021.01)

(52) U.S. Cl.
CPC .......... *H04L 9/0833* (2013.01); *H04L 9/0891* (2013.01); *H04L 63/0485* (2013.01); *H04L 63/164* (2013.01); *H04W 12/041* (2021.01); *H04L 63/065* (2013.01)

(58) Field of Classification Search
CPC ... H04L 63/06; H04L 63/065; H04L 63/0485; H04L 63/164; H04L 9/08; H04L 9/0819; H04L 9/0891; H04L 9/0866; H04L 9/0833; H04L 9/14; H04W 12/04; H04W 12/041; H04W 12/043; H04W 12/0433
See application file for complete search history.

(56) References Cited

U.S. PATENT DOCUMENTS

| | | | |
|---|---|---|---|
| 8,392,496 B2 * | 3/2013 | Linden | G06F 11/2028 709/200 |
| 11,522,845 B2 * | 12/2022 | Bao | H04L 63/08 |
| 2010/0115606 A1 * | 5/2010 | Samovskiy | H04L 67/10 709/250 |
| 2012/0272051 A1 * | 10/2012 | Chittigala | H04L 63/045 380/278 |
| 2013/0054966 A1 * | 2/2013 | Clay | H04L 63/0869 713/168 |
| 2017/0300553 A1 * | 10/2017 | Keene | G06F 16/275 |
| 2018/0083785 A1 * | 3/2018 | Shields | H04W 12/033 |

\* cited by examiner

*Primary Examiner* — Shaqueal D Wade-Wright (74) *Attorney, Agent, or Firm* — DALY, CROWLEY, MOFFORD & DURKEE, LLP (57) ABSTRACT

An example methodology includes, by a first node of a cluster, generating a first key for intra-cluster communication, updating a keys table with the generated first key, generating a secure communication configuration file on the first node, wherein the secure communication configuration file includes the first key, and loading the secure communication configuration file including the first key to a security process on the first node. The method may also include, by the first node of the cluster, generating a second key for an inter-cluster communication with another node of another cluster, updating the keys table with the generated second key, updating the secure communication configuration file on the first node to include the second key, and loading the secure communication configuration file updated with the second key to the security process on the first node.

17 Claims, 7 Drawing Sheets

| Cluster ID | Accessible By | Created By | Key Value | Description |
|---|---|---|---|---|
| [C-1] | C-1's Node ID/Name list | Node ID | Key1 | Key1 will be shared between all nodes of cluster-1 (C-1). Any cluster-1 node can read and write. But no "other cluster" node can read or write. |
| [C-2] | C-2's Node ID/Name list | Node ID | Key2 | Key2 will be shared between all nodes of cluster-2 (C-2). Any cluster-2 node can read and write. But no "other cluster" node can read or write. |
| [C-1]:[C-2] | C-1, C-2 | Node ID | Key3 | Key3 will be shared between all nodes of cluster-1 (C-1) and cluster-2 (C-2). Any cluster-1 and cluster-2 node can read and write. But no "other cluster" node can read or write. |
| ... | ... | ... | ... | ... |

SYSTEMS AND METHODS FOR SECURE CLUSTER COMMUNICATION

BACKGROUND

High availability (HA) is the ability of a system, component, or application to operate continuously without failing for a designated period. HA systems may be resilient to failures of the systems' components. This resiliency is typically achieved by providing redundant components so that if one component fails, a redundant component can take over performing the tasks of the failed component. High availability devices, such as nodes (e.g., servers), may be grouped into clusters.

The nodes of a cluster may work as a team to provide services even if some of the nodes fail. As long as at least one of the nodes of a cluster remains active, the cluster may provide the services configured on the nodes. For instance, when one of the nodes of a cluster fails, the applications on that node can fail over to the next available node of the cluster. The clusters can also provide fail over for one another, and routers (e.g., edge routers) at each cluster may be configured to communicate with another cluster in cases where a primary cluster fails.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, responsive to a determination, by a node of a cluster, that the node is a first node of the cluster, generating a first key for intra-cluster communication, updating a keys table with the generated first key, generating a secure communication configuration file on the first node, wherein the secure communication configuration file includes the first key, and loading the secure communication configuration file including the first key to a security process on the first node.

In some embodiments, the method also includes, responsive to the determination that the node is the first node of the cluster, determining, by the first node, whether a key exists for an inter-cluster communication with another node of another cluster and, responsive to a determination that a key does not exist for the inter-cluster communication with the another node of the another cluster, by the first node, generating a second key for the inter-cluster communication with the another node of the another cluster, updating the keys table with the generated second key, updating the secure communication configuration file on the first node to include the second key, and loading the secure communication configuration file updated with the second key to the security process on the first node.

In some embodiments, the security process on the first node utilizes Internet Protocol Security (IPSec). In one aspect, the secure communication configuration file on the first node is an IPSec configuration file.

In some embodiments, the method also includes, responsive to a determination, by the node of the cluster, that the node is a subsequent node following the first node of the cluster, by the subsequent node, obtaining one or more keys from the keys table based on an identifier of the subsequent node, generating a secure communication configuration file on the subsequent node, wherein the secure communication configuration file includes the one or more keys from the keys table, and loading the secure communication configuration file including the one or more keys from the keys table to a security process on the subsequent node.

In some embodiments, the security process on the subsequent node utilizes IPSec. In one aspect, the secure communication configuration file on the subsequent node is an IPSec configuration file.

In some embodiments, the keys table is provided on a server remote from the cluster.

In some embodiments, the method also includes, responsive to a determination, by the node of the cluster, that there is a new key in the keys table, by the node, obtaining the new key from the keys table based on an identifier of the node, updating a secure communication configuration file with the new key from the keys table, and loading the secure communication configuration file including the new key from the keys table to a security process on the node.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Presently, high availability (HA) systems, such as those provided using SUSE Linux Enterprise High Availability, do not secure communication via authentication or encryption within clusters or across clusters. Without the underlying secure communication framework, the individual applications hosted on the nodes of the cluster need to implement security for intra-cluster communication (e.g., within cluster communication) and inter-cluster communication (e.g., across cluster communication). Currently, a secure communication protocol, such as Internet Protocol Security (IPSec), needs to be manually created and configured on each node of the clusters to provide the secure communication infrastructure. Furthermore, the manual IPSec configuration needs to be performed only after all the clusters are created. The same manual procedure is also followed to update the keys (e.g., security association keys). These manual processes are labor-intensive and prone to human error and increased resource usage by computing devices used to correctly create and configure the secure communication protocol.

Disclosed herein are concepts, structures, and techniques for a secure cluster communication infrastructure for intra-cluster communication and inter-cluster communication using a secure communication protocol, such as IPSec. The secure cluster communication infrastructure allows applications hosted on the nodes of the cluster to trust and use the underlying secure communication features, such as authentication and encryption, for intra-cluster communication and inter-cluster communication. As used herein, the term "intra-cluster communication" refers to communication between nodes of the same cluster, and the term "inter-cluster communication" refers to communication between nodes of different clusters. In some embodiments, a keys table may be utilized to maintain and share security association keys (sometimes referred to herein more simply as "keys") across the various nodes of the clusters. According to some embodiments, during an install of a cluster, a first node of the cluster, during boot up, may generate a key for intra-cluster communication and one or more keys for inter-cluster communication, and securely access and update the keys table with the generated keys. The first node of the cluster may also load the keys to a security process on the first node to be used for intra-cluster and inter-cluster communication. Subsequent nodes (e.g., a node that is not a first node) of the of the cluster, during boot up, may securely access the keys table and obtain their keys from the keys table based on their unique node identifiers (e.g., node names). The subsequent nodes of the cluster may then load the keys obtained from the keys table to respective security processes on the subsequent nodes to be used for intra- and inter-cluster communication. Numerous configurations and variations will be apparent in light of this disclosure.

Figure 1:
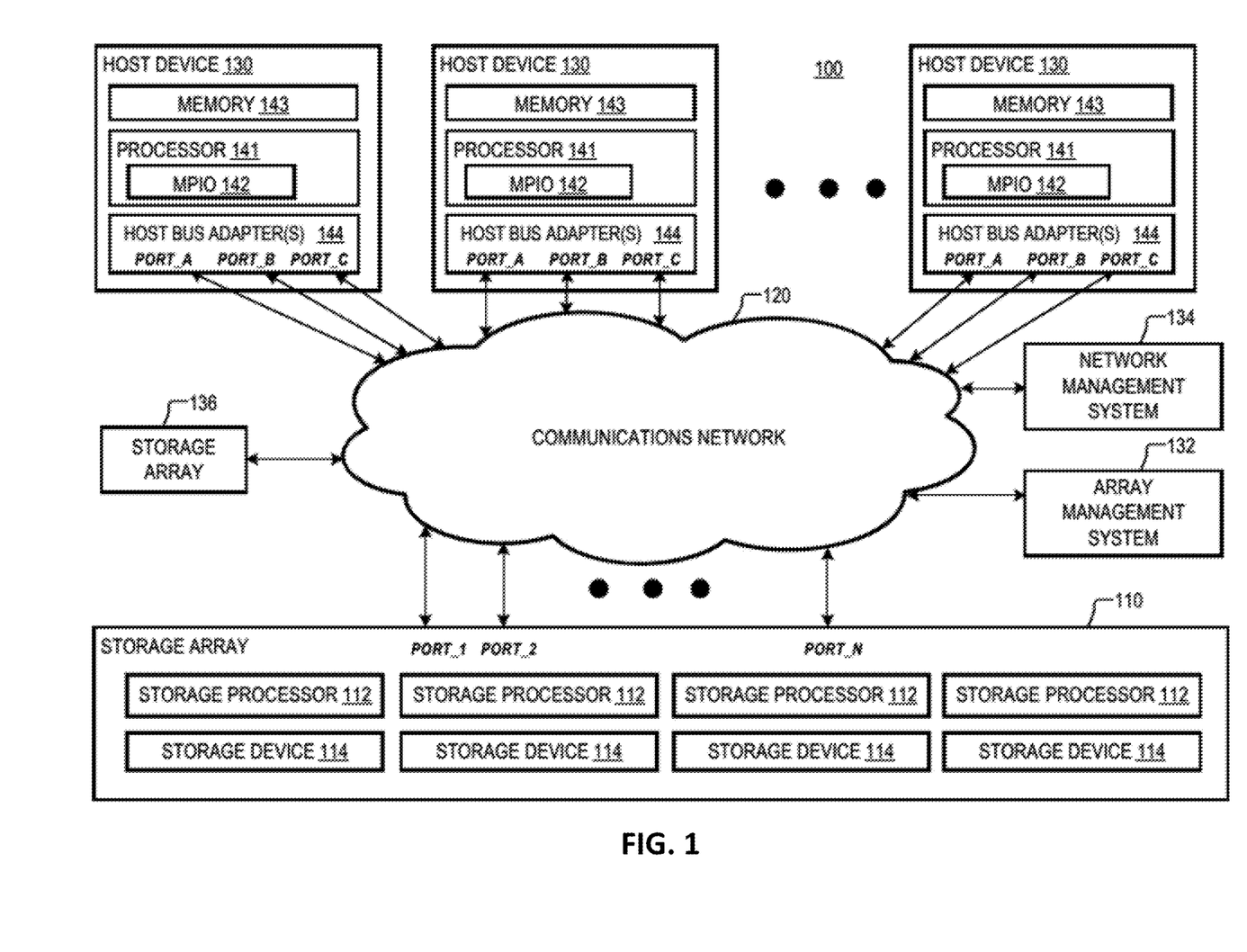
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 700 of FIG. 7. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1. HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 7:
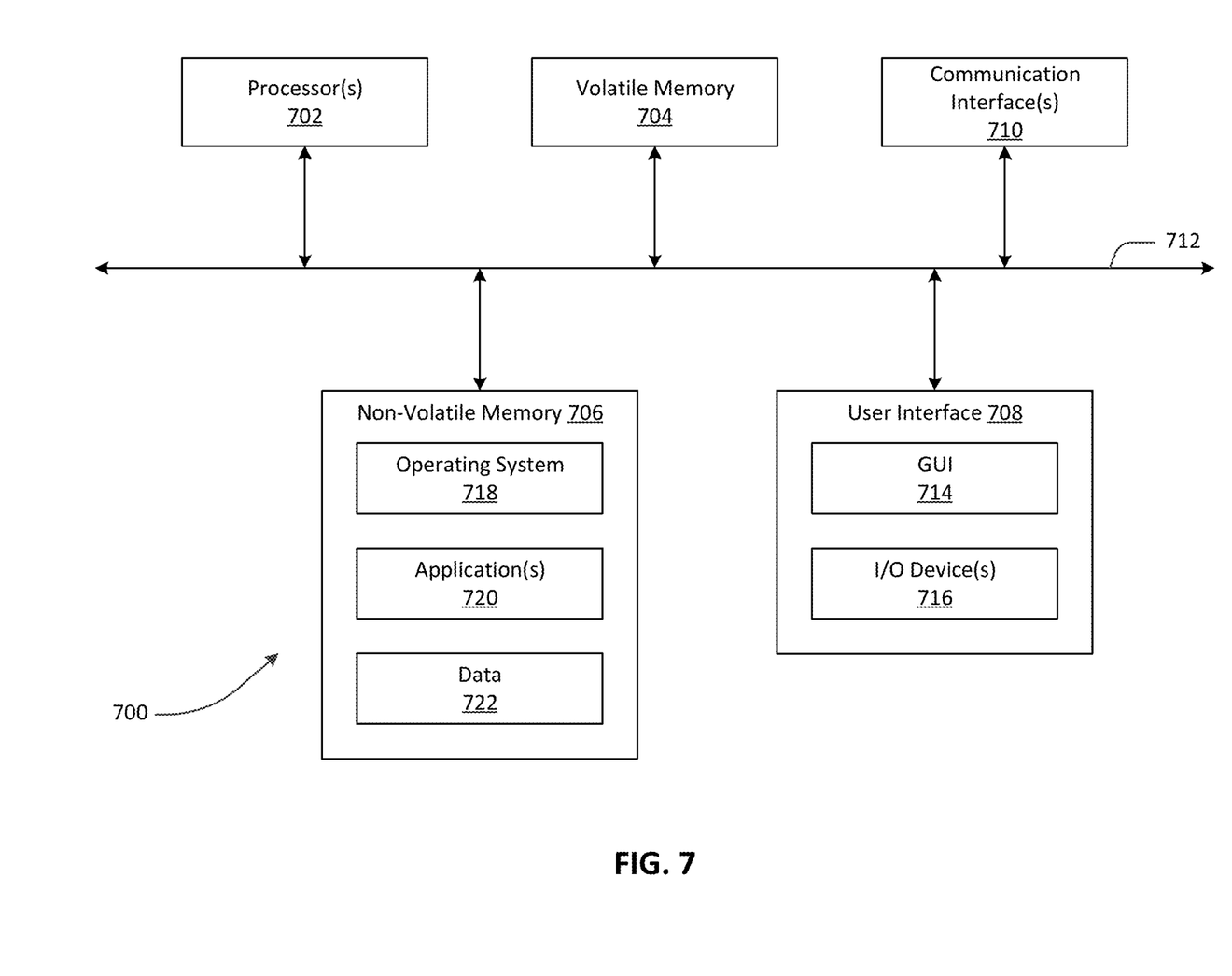
FIG. 7 is a block diagram illustrating selective components of an example computing device in which various aspects of the disclosure may be implemented, in accordance with an embodiment of the present disclosure.

Array management system 132 may include a computing device, such as computing device 700 of FIG. 7. Array management system 132 may be used by a system administrator to re-configure storage array 110, e.g., when degraded performance of storage array 110 is detected.

Network management system 134 may include a computing device, such as computing device 700 of FIG. 7. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
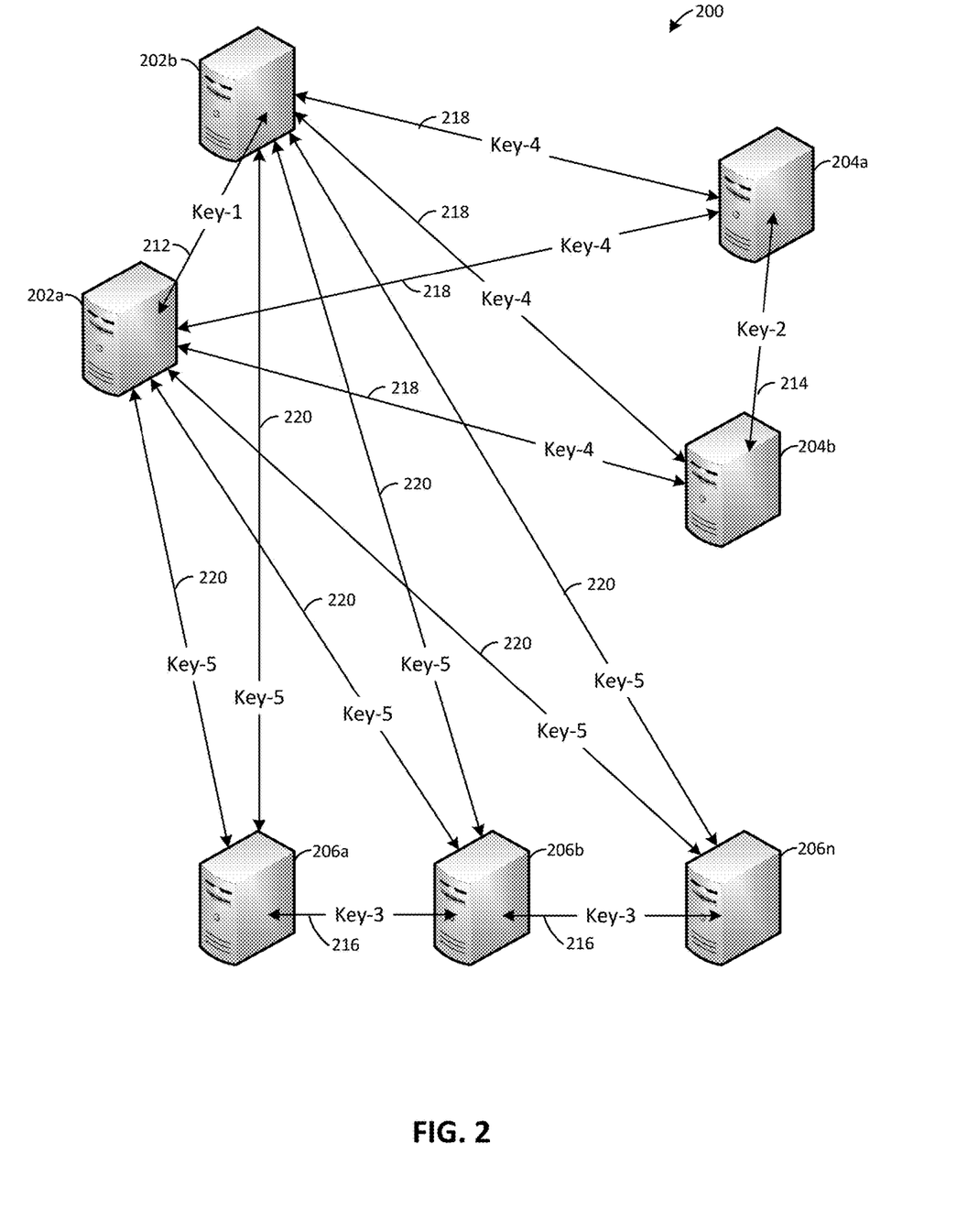
FIG. 2 is a diagram of an illustrative cluster computing environment in which secure cluster communications may be implemented, in accordance with an embodiment of the present disclosure.

Referring now to FIG. 2, is a diagram of an illustrative cluster computing environment 200 in which secure cluster communications may be implemented, in accordance with an embodiment of the present disclosure. As shown, illustrative cluster computing environment 200 includes nodes 202a, 202b (202 generally), nodes 204a, 204b (204 generally), and nodes 206a-206n (206 generally). In some embodiments, nodes 202, 204, 206 may correspond to nodes (e.g., servers) of a storage system. For example, nodes 202, 204, 206 may correspond to host devices 130 of FIG. 1. However, disclosed structures and techniques are not limited to storage systems or any other particular type of client-server systems and may be broadly applicable to any systems that involve the use of clusters and cluster communications.

In the example of FIG. 2, nodes 202 may comprise a cluster (e.g., a management cluster), nodes 204 may comprise another cluster (e.g., a service cluster), and nodes 206 may comprise still another cluster (e.g., a file cluster). In other words, the management cluster is a two node cluster composed of nodes 202a, 202b, the service cluster is a two node cluster composed of nodes 204a, 204b, and the file cluster is an n node cluster composed of nodes 206a-206n. The number of clusters, and the number of nodes in each cluster, shown in FIG. 2 is merely illustrative and the structures and techniques sought to be protected herein can be applied to any number of clusters and any number of nodes in each of the clusters.

Nodes 202a, 202b of the management cluster may be configured to communicate using IPSec and a Key-1. See reference numeral 212 in FIG. 2. For example, during an install of the management cluster, the first node of the management cluster (e.g., node 202a or node 202b) may generate Key-1 for use by the nodes of the management cluster for communications within the management cluster (i.e., for intra-management cluster communication). As a result, applications running on nodes 202 of the management cluster can securely communicate with one another using Key-1.

Nodes 204a, 204b of the service cluster may be configured to communicate using IPSec and a Key-2. See reference numeral 214 in FIG. 2. For example, during an install of the service cluster, the first node of the service cluster (e.g., node 204a or node 204b) may generate Key-2 for use by the nodes of the service cluster for communications within the service cluster (i.e., for intra-service cluster communication). As a result, applications running on nodes 204 of the service cluster can securely communicate with one another using Key-2.

Nodes 2064a-206n of the file cluster may be configured to communicate using IPSec and a Key-3. See reference numeral 216 in FIG. 2. For example, during an install of the file cluster, the first node of the file cluster (e.g., any one of nodes 206a-206n) may generate Key-3 for use by the nodes of the file cluster for communications within the file cluster (i.e., for intra-file cluster communication). As a result, applications running on nodes 206 of the file cluster can securely communicate with one another using Key-3.

Nodes 202 of the management cluster and nodes 204 of the service cluster may be configured to communicate across the clusters using IPSec and a Key-4. See reference numeral 218 in FIG. 2. For example, during an install of the management cluster or the service cluster, the first node of either the management cluster (e.g., node 202a or node 202b) or the service cluster (e.g., node 204a or node 204b) may generate Key-4 for use by the nodes of the management cluster and the nodes of the service cluster for communications across the management and service clusters (i.e., for inter-cluster communication between the management cluster and the service cluster). As a result, applications running on nodes 202 of the management cluster and applications running on nodes 204 of the service cluster can securely communicate across the management and service clusters using Key-4. According to one embodiment, the first node of either the management cluster or the service cluster can generate Key-4 upon determining that a key does not already exist for the inter-cluster communication between the management cluster and the service cluster. In such embodiments, the first node does not generate Key-4 if a key already exists for the inter-cluster communication between the management cluster and the service cluster.

Nodes 202 of the management cluster and nodes 206 of the file cluster may be configured to communicate across the clusters using IPSec and a Key-5. See reference numeral 220 in FIG. 2. For example, during an install of the management cluster or the file cluster, the first node of either the management cluster (e.g., node 202a or node 202b) or the file cluster (e.g., any one of nodes 206a-206n) may generate Key-5 for use by the nodes of the management cluster and the nodes of the file cluster for communications across the management and file clusters (i.e., for inter-cluster communication between the management cluster and the file cluster). As a result, applications running on nodes 202 of the management cluster and applications running on nodes 206 of the file cluster can securely communicate across the management and file clusters using Key-5. According to one embodiment, the first node of either the management cluster or the file cluster can generate Key-5 upon determining that a key does not already exist for the inter-cluster communication between the management cluster and the file cluster. In such embodiments, the first node does not generate Key-5 if a key already exists for the inter-cluster communication between the management cluster and the file cluster.

Figure 3:
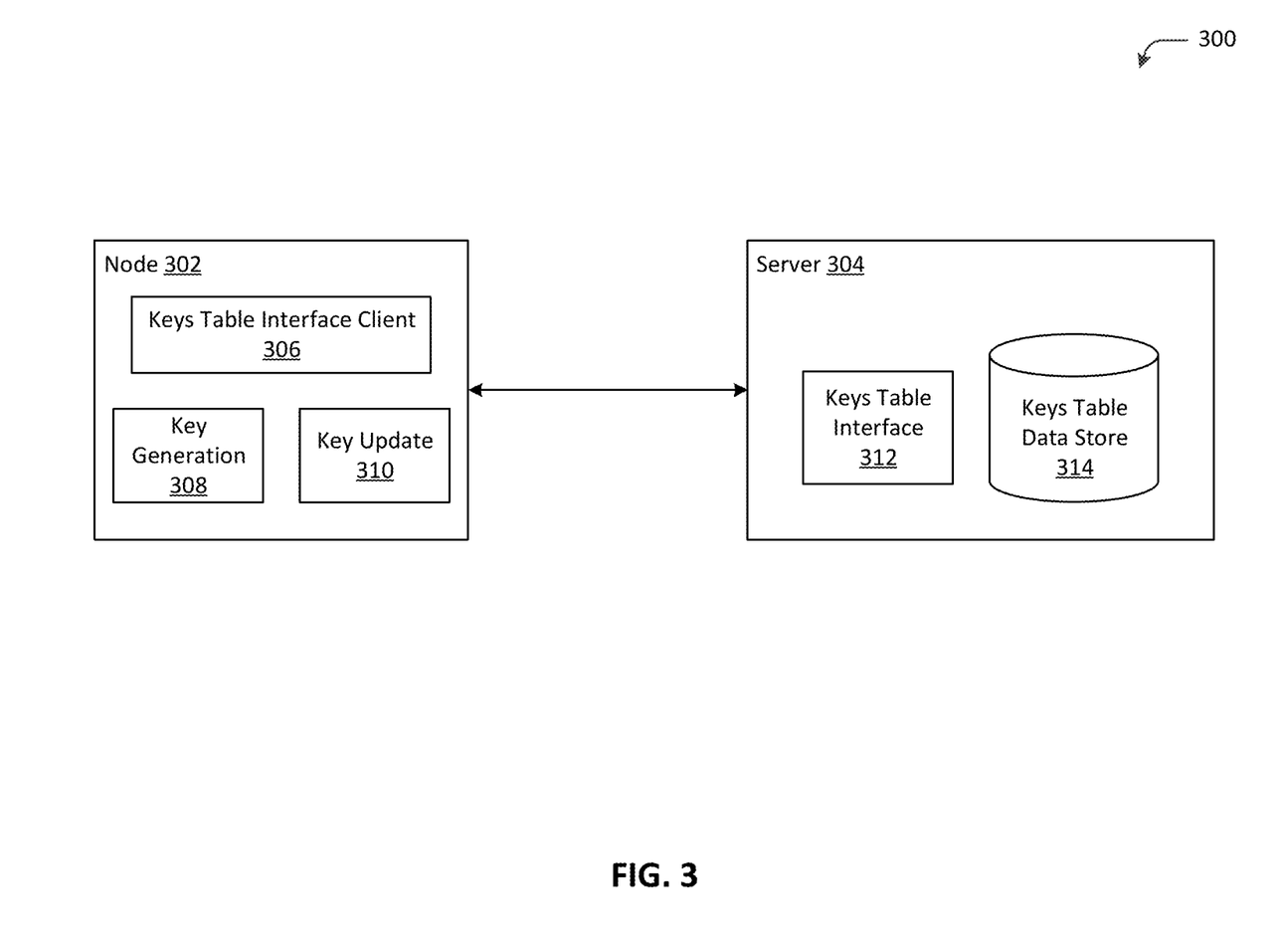
FIG. 3 is a block diagram of an illustrative system for secure cluster communications, in accordance with an embodiment of the present disclosure, in accordance with an embodiment of the present disclosure.

FIG. 3 is a block diagram of an illustrative system 300 for secure cluster communications, in accordance with an embodiment of the present disclosure. Illustrative system 300 includes a node 302 configured to communicate with a server 304 via one or more communication networks (not shown). The communication networks can include, for example, the Internet, LANs, WANs, FC networks, etc. In some embodiments, node 302 may correspond to any of nodes 202, 204, 206 of FIG. 2. Server 304 may be hosted on a physical and/or virtual machine or processing device that is separate from node 302 and outside of any cluster within a clustered environment. That is, server 304 may be a non-clustered entity outside the clustered environment. For example, relating FIG. 3 to FIG. 2, server 304 may be a node outside of clustered computing environment 200 (e.g., outside of the management, service, and file clusters) but accessible by nodes 202, 204, 206.

To promote clarity in the drawings, FIG. 3 shows a single node 302 communicably coupled to server 304. However, it will be appreciated that more than one node 302 may be communicably coupled to server 304. In the example of FIG. 3, node 302 includes a keys table interface client 306, a key generation module 308, and a key update module 310. Also, in this example, server 304 includes a keys table interface 312 and a keys table data store 314.

Referring to node 302, keys table interface client 306 is operable to generate the keys for intra-cluster communication and inter-cluster communication, as needed, as well as obtain the keys for use by node 302 for communications within cluster and across clusters. In more detail, according to one embodiment, keys table interface client 306 can determine the unique identifier (e.g., node name) of node 302 during boot up of node 302. For example, in one implementation, keys table interface client 306 can retrieve the node name or node identifier (ID) that uniquely identifies node 302 from a secure location (e.g., from secure memory) as part of the node 302 boot process. Keys table interface client 306 can then determine whether node 302 is a first node of a cluster. For example, keys table interface client 306 may use the retrieved node name to determine from the underlying infrastructure whether node 302 is a first node of the cluster.

Upon determining that node 302 is a first node of a cluster, keys table interface client 306 can generate a key for intra-cluster communication. Keys table interface client 306 can then update a keys table maintained on server 304 with the generated key along with information about the nodes in the cluster that can access the generated key. For example, according to one implementation, keys table interface client 306 on node 302 can provide the node name that uniquely identifies node 302 to keys table interface 312 on server 304 to securely access the keys table. Keys table interface client 306 can also check the keys table to determine whether keys have been generated for communications with the other clusters. By way of an example, suppose that there are three clusters, Cluster A, B, and C, and that node 302 is the first node of Cluster A. In this example, keys table interface client 306 on node 302 can check to determine whether a key has been generated for the inter-cluster communication between Cluster A and Cluster B. and whether a key has been generated for the inter-cluster communication between Cluster A and Cluster C. For example, according to one implementation, keys table interface 312 can check the keys table to determine whether there are respective keys for each inter-cluster communication (e.g., determine whether the keys table includes respective keys for each inter-cluster communication). Based on this determination, keys table interface client 306 can generate a key for each inter-cluster communication if a key does not already exist. Keys table interface client 306 can then update the keys table with the generated key(s) for inter-cluster communication along with information about the clusters that can access the generated keys. Further description of the keys table is provided below at least with respect to FIG. 4.

Upon generating the key(s) and updating the keys table to include the generated key(s), keys table interface client 306 can generate a secure communication configuration file, such as, for example, an IPSec configuration file with the generated key(s). The secure communication configuration file may contain the connection definitions for the intra-cluster communication and the inter-cluster communication, including the key(s) among other information. Keys table interface client 306 can then load the secure communication configuration file to a security process on node 302, such as, for example, strongSwan. Once the secure communication configuration file including the key(s) is loaded, the security process on node 302 can provide the secure communication framework (e.g., authentication and encryption) based on the connection definitions contained in the secure communication configuration file at the node level (e.g., create security associations with the key(s)). Applications on node 302 can then rely on the security provided by the underlying secure communication framework.

If keys table interface client 306 on node 302 determines that node 302 is not a first node of a cluster, for example, determines that node 302 is a subsequent node following the first node of the cluster, keys table interface client 306 can obtain or otherwise retrieve the key(s) defined for node 302 from the keys table. For example, according to one implementation, keys table interface client 306 on node 302 can provide the node name that uniquely identifies node 302 to keys table interface 312 on server 304 to securely access the keys table. Keys table interface 312 can provide to keys table interface client 306 the key(s) defined for node 302 in the keys table. Having obtained the key(s) from the keys table, keys table interface client 306 can generate a secure communication configuration file (e.g., an IPSec configuration file) with the obtained key(s). Keys table interface client 306 can then load the secure communication configuration file to a security process on node 302 (e.g., load the secure communication configuration file including the key(s) to strongSwan on node 302). Once the secure communication configuration file including the key(s) is loaded, the security process on node 302 can provide the secure communication framework (e.g., authentication and encryption) based on the connection definitions contained in the secure communication configuration file at the node level (e.g., create security associations with the key(s)). Applications on node 302 can then rely on the security provided by the underlying secure communication framework.

Key generation module 308 operates to update the keys in the keys table on a continuous or periodic basis. For example, if key generation module 308 on node 302 determines that node 302 is a first node (e.g., a domain controller node) of the cluster, key generation module 308 can update the key for intra-cluster communication in the keys table. For example, according to one implementation, similar to keys table interface client 306 described above, key generation module 308 can provide the node name that uniquely identifies node 302 to keys table interface 312 on server 304 to securely access the keys table. Key generation module 308 can then generate a new key for intra-cluster communication and update the keys table with the newly generated key for intra-cluster communication (e.g., replace the existing key for intra-cluster communication in the keys table with the new key).

In some embodiments, if key generation module 308 on node 302 determines that node 302 is a first node (e.g., a domain controller node) of a master cluster, key generation module 308 can update the keys for inter-cluster communication in the keys table. For example, according to one implementation, key generation module 308 can provide the node name that uniquely identifies node 302 to keys table interface 312 on server 304 to securely access the keys table. Key generation module 308 can then generate a new key for each inter-cluster communication and update the keys table with the newly generated keys for the inter-cluster communication (e.g., replace the existing keys for inter-cluster communication in the keys table with the new keys).

In some embodiments, key generation module 308 may be implemented as a cron job on node 302. In such embodiments, key generation module 308 can run at predetermined intervals or periods (e.g., run once every month) to generate a new key for the intra-cluster communication and/or generate keys for the inter-cluster communication, and update the keys table accordingly. The predetermined intervals or periods may be configured as part of a task execution policy.

Key update module 310 operates to check for changes in the keys in the keys table. For example, key update module 310 can compare the keys in the secure communication configuration file (e.g., IPSec configuration file) on node 302 with the keys in the keys table to check for any key change. According to one implementation, key update module 310 can provide the node name that uniquely identifies node 302 to keys table interface 312 on server 304 to securely access the keys table. If it is determined that there are changes in the keys, key update module 310 can obtain the changed keys (e.g., new keys defined for node 302) from the keys table. Having obtained the changed keys from the keys table, key update module 310 can update the secure communication configuration file (e.g., the IPSec configuration file) on node 302 with the changed keys. Key update module 310 can then load the secure communication configuration file to the security process on node 302. Once the secure communication configuration file including the changed keys is loaded, the security process on node 302 can start using the changed keys to provide the secure communication framework (e.g., create new security associations with the updated keys). In some embodiments, the older security associations using the older keys can be maintained until both end points of the communication start using the update key. Applications on node 302 can then rely on the security provided by the underlying secure communication framework.

In some embodiments, key update module 310 may be implemented as a cron job on node 302. In such embodiments, key update module 310 can run at predetermined intervals or periods (e.g., run once every hour) to check for changes in the keys. The predetermined intervals or periods may be configured as part of a task execution policy.

Referring to server 304, keys table interface 312 operates to provide a secure interface to the keys table. For example, according to one implementation, keys table interface 312 can provide access to the contents of the keys table based on the unique identifier (e.g., node ID or node name) of the node that is trying to access the keys table. Providing access to the keys table in this way protects against impersonation since keys a keys table interface client on a node (e.g., keys table interface client 306 on node 302) retrieves the node's unique identifier from a secure location on the node.

Keys table data store 314 can include a database or other form of storage configured to store information related to the keys generated for intra-cluster communication and the keys generated for inter-cluster communication. For example, in one implementation, keys table data store 314 can store the keys table utilized to maintain and share the keys across the various nodes of the clusters. Keys table data store 314 may be hosted on the same server (e.g., server 304) as keys table interface 312. In other implementations, keys table data store 314 may be hosted remotely from keys table interface 312 (e.g., hosted within a cloud environment).

Figure 4:
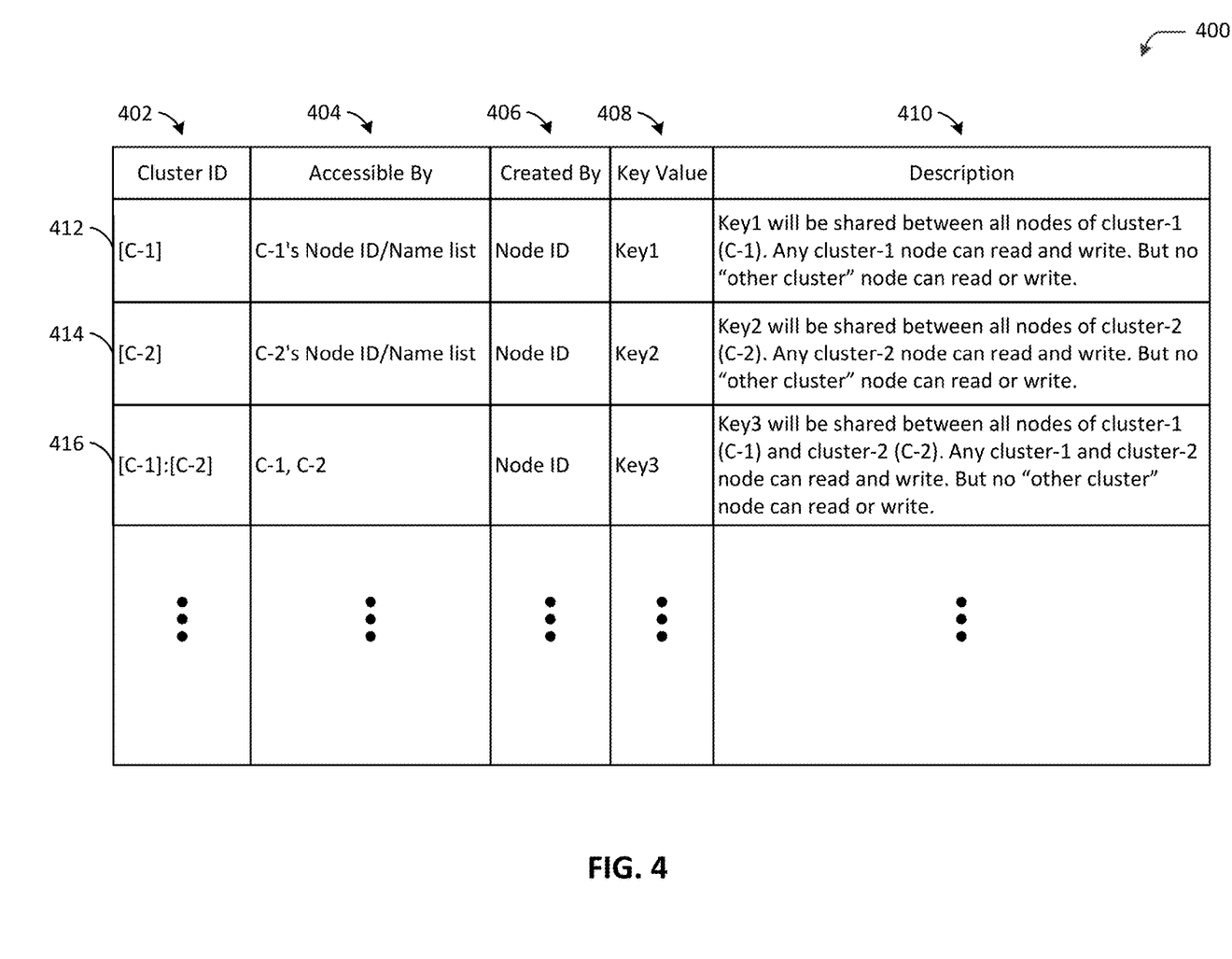
FIG. 4 shows an example keys table data structure, in accordance with an embodiment of the present disclosure.

FIG. 4 shows an example keys table data structure 400, in accordance with an embodiment of the present disclosure. Illustrative keys table data structure 400 may record the keys table which contains the keys and the corresponding rules that specify how the keys are to be shared. In this regard, example keys table data structure 400 can be understood to be a type of access control list for the keys. In embodiments, keys table data structure 400 may be stored in a data store (e.g., stored in keys table data store 314 of FIG. 3).

As shown, keys table data structure 400 may be in table form in which each row (or "record" or "entry") represents a key. In the table, each record can include a Cluster ID field 402, an Accessible By field 404, a Created By field 406, a Key Value field 408, and a Description field 410, which contain information/data related to each record.

Cluster ID field 402 can indicate a cluster (e.g., a cluster name or cluster ID) with which a key specified in Key Value field 408 is to be shared with. Accessible By field 404 can indicate the nodes (e.g., node name or node ID) of a cluster indicated in Cluster ID field 402 that can access a key specified in Key Value field 408. Created By field 406 can indicate the node (e.g., node ID) that generated (or "created") a key specified in Key Value field 408. Key Value field 408 can indicate a key (e.g., a key for the IPSec security association). Description field 410 can include text that describes the record in keys table data structure 400.

In the example of FIG. 4, keys table data structure 400 includes entries 412-416. Entry 412 is a record of a key having a value "Key1" which was created by a node identified in Created By field 406 of entry 412. As indicated by the information/data contained in fields 402, 404 and described by the text in field 410 of entry 412, "Key1" can be shared between all nodes of cluster "C-1" to read and write, but no other cluster can access "Key1". Thus, "Key1" can be understood as a key for intra-cluster communication (i.e., communication within cluster "C-1"). Entry 414 is a record of a key having a value "Key2" which was created by a node identified in Created By field 406 of entry 414. As indicated by the information/data contained in fields 402, 404 and described by the text in field 410 of entry 414, "Key2" can be shared between all nodes of cluster "C-2" to read and write, but no other cluster can access "Key2". Thus, "Key2" can be understood as a key for intra-cluster communication (i.e., communication within cluster "C-2"). Entry 416 is a record of a key having a value "Key3" which was created by a node identified in Created By field 406 of entry 416. As indicated by the information/data contained in fields 402, 404 and described by the text in field 410 of entry 416, "Key3" can be shared between all nodes of cluster "C-1" and cluster "C-2" to read and write, but no other cluster can access "Key3". Thus, "Key3" can be understood as a key for inter-cluster communication (i.e., communication across cluster "C-1" and cluster "C-2").

The number of records of keys depicted in keys table data structure 400 is for illustration, and those skilled in the art will appreciate that there may be a different number of records of keys, including large numbers of records of keys in keys table data structure 400.

Figure 5:
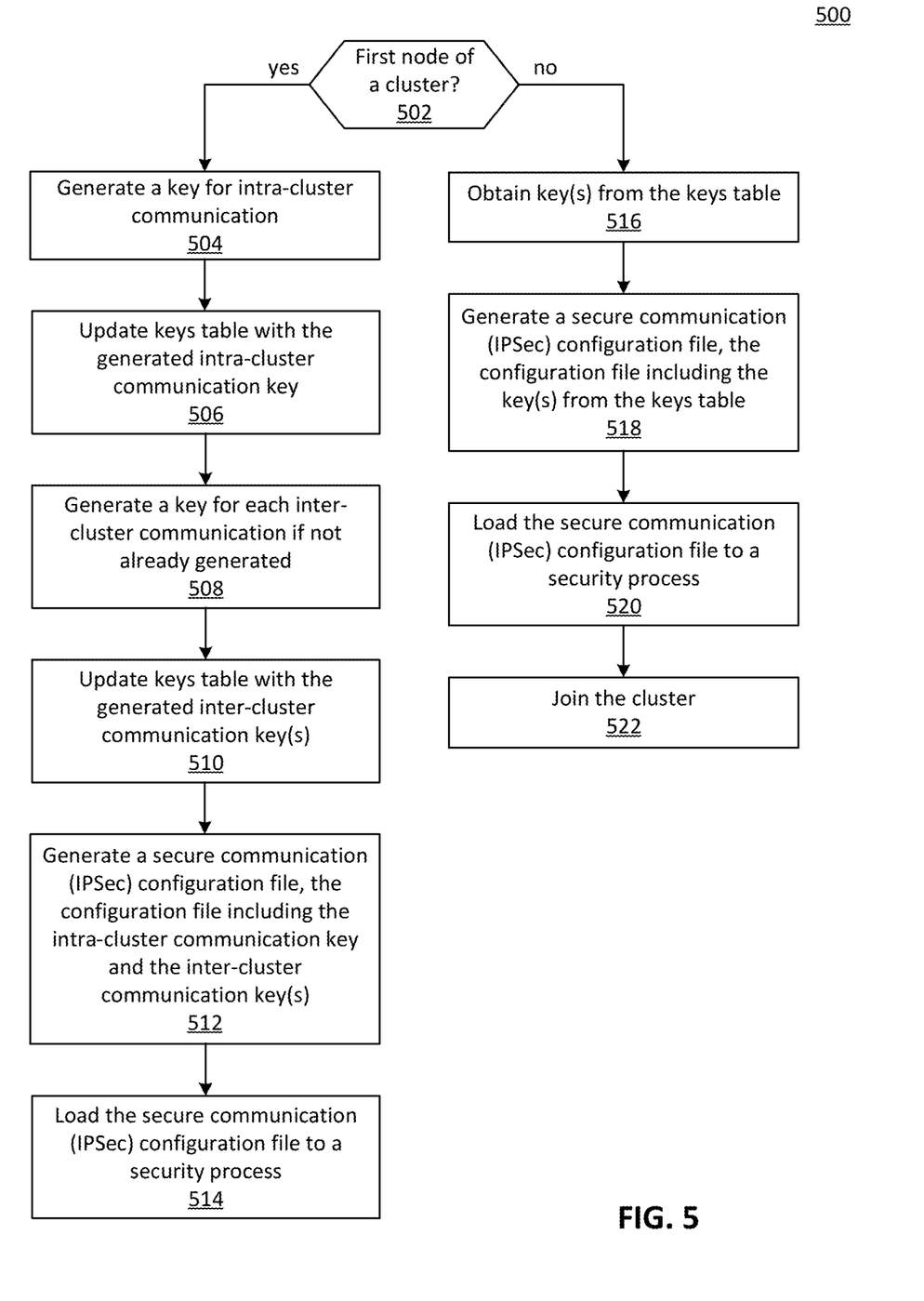
FIG. 5 is a flow diagram of an example process for generating and obtaining keys for secure cluster communication, in accordance with an embodiment of the present disclosure.

FIG. 5 is a flow diagram of an example process 500 for generating and obtaining keys for secure cluster communication, in accordance with an embodiment of the present disclosure. Illustrative process 500 may be implemented, for example, within system 300 of FIG. 3. In more detail, process 500 may be performed, for example, in whole or in part by keys table interface client 306 or any combination of this and other components of system 300 described with respect to FIG. 3.

With reference to process 500 of FIG. 5, at 502, a check may be performed to determine whether a node is a first node of a cluster. For the purposes of this discussion, it is assumed that a node of the cluster is performing this check during boot up of the node (e.g., while being booted). For example, a keys table interface client (e.g., keys table interface client 306 of FIG. 3) on the node can retrieve an identifier that uniquely identifies the node and use the unique identifier to determine whether the node is a first node of the cluster.

If, at 502, it is determined that the node is a first node of the cluster, then, at 504, a key for intra-cluster communication may be generated. For example, the keys table interface client on the node can generate a key that can be shared between the nodes of the cluster and used for communication within the cluster. The keys table interface client may also create a rule that specifies how the generated key is to be shared.

At 506, the keys table may be updated with the generated intra-cluster communication key. For example, the keys table interface client on the node can use the unique identifier of the node to securely access the keys table and update the keys table with the generated intra-cluster communication key and the corresponding rule for sharing the generated intra-cluster communication key.

At 508, a key for each inter-cluster communication may be generated if such key is not already generated. For example, the keys table interface client on the node can check the keys table to determine whether keys have been generated for communications between the cluster to which the node belongs and other clusters. That is, the keys table interface client on the node can check the keys table to determine whether keys exist for inter-cluster communication between the cluster to which the node belongs and each of the other clusters. The keys table interface client on the node can generate a key for each inter-cluster communication if a key does not already exist in the keys table. The keys table interface client may also create a rule for each generated inter-cluster communication key that specifies how the generated inter-cluster communication key is to be shared.

At 510, the keys table may be updated with the generated inter-cluster communication key(s). For example, the keys table interface client on the node can use the unique identifier of the node to securely access the keys table and update the keys table with the generated inter-cluster communication key(s) and the corresponding rule for sharing the generated inter-cluster communication key(s).

At 512, a secure communication configuration file may be generated. For example, the keys table interface client on the node can generate a secure communication configuration file (e.g., an IPSec configuration file) that contains connection definitions for intra-cluster communication and inter-cluster communications, including the keys for the intra-cluster communication and the keys for the inter-cluster communications, among other information.

At 514, the secure communication configuration file may be loaded to a security process on the node. For example, the keys table interface client on the node can load the generated secure communication configuration file to a security process (e.g., a security service such as strongSwan) on the node. Once the secure communication configuration file including the key(s) is loaded, the security process on the node can use the keys and the connection definitions included in the loaded configuration file to provide a secure communication framework (e.g., authentication and encryption) at the node level.

Otherwise, if, at 502, it is determined that the node is not a first node of the cluster (e.g., the node is a subsequent node of the cluster), then, at 516, key(s) may be obtained from the keys table. In this case, the node is a subsequent node of the cluster. For example, as a subsequent node of the cluster, the keys table interface client on the subsequent node can obtain the key(s) defined for the node from the keys table. The keys table interface client on the subsequent node may use the unique identifier of the node to securely access and obtain from the keys table the keys defined for the node.

At 518, a secure communication configuration file may be generated. For example, the keys table interface client on the subsequent node can generate a secure communication configuration file (e.g., an IPSec configuration file) that contains connection definitions for intra-cluster communication and inter-cluster communications, including the keys obtained from the keys table for the intra-cluster communication and the keys for the inter-cluster communications, among other information.

At 520, the secure communication configuration file may be loaded to a security process on the subsequent node. For example, the keys table interface client on the subsequent node can load the generated secure communication configuration file to a security process (e.g., a security service such as strongSwan) on the subsequent node. Once the secure communication configuration file including the key(s) is loaded, the security process on the subsequent node can use the keys and the connection definitions included in the loaded configuration file to provide a secure communication framework at the node level.

At 522, the cluster may be joined. For example, upon loading the configuration file, the keys table interface client on the subsequent node can join the subsequent node to the cluster.

Figure 6:
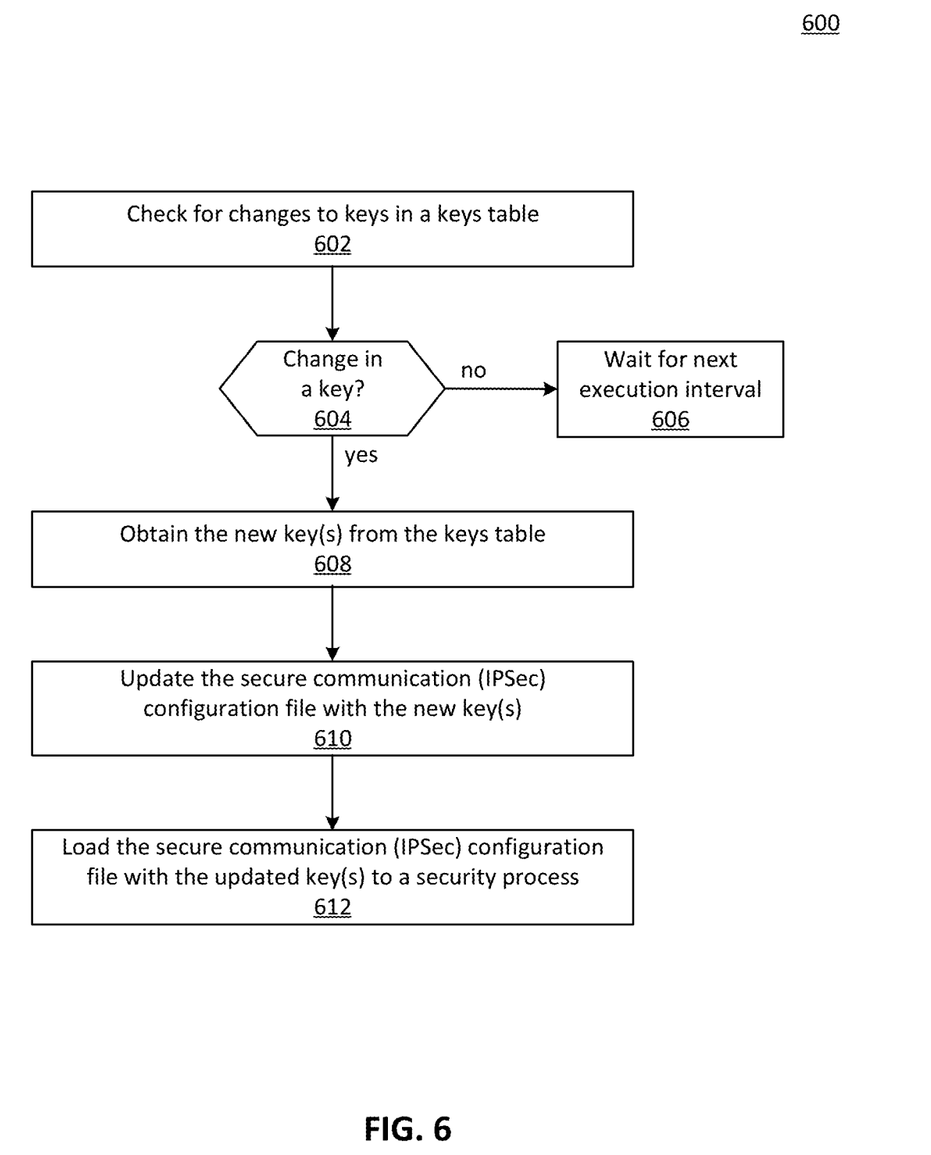
FIG. 6 is a flow diagram of an example process for obtaining new keys generated for secure cluster communication, in accordance with an embodiment of the present disclosure.

FIG. 6 is a flow diagram of an example process 600 for obtaining new keys generated for secure cluster communication, in accordance with an embodiment of the present disclosure. Illustrative process 600 may be implemented, for example, within system 300 of FIG. 3. In more detail, process 600 may be performed, for example, in whole or in part by key update module 310 or any combination of this and other components of system 300 described with respect to FIG. 3.

With reference to process 600 of FIG. 6, at 602, a check may be performed to determine whether there are changes in the keys in a keys table. For the purposes of this discussion, it is assumed that a key update module (e.g., key update module 310 of FIG. 3) on a node of a cluster is checking a keys table for changes to its keys. It is also assumed that the key update module is implemented as a cron job that is configured to run daily on the node. For example, the key update module on the node can compare the keys in a secure communication configuration file (e.g., IPSec configuration file) on the node with the keys in the keys table to check for any key change. The key update module on the node may use the unique identifier of the node to securely access and compare the keys in the keys table.

If, at 604, it is determined that there is no change in a key, then, at 606, the key update module on the node may wait for the next execution interval. In this case, since the key update module on the node determines that there are no changes in any of its keys, the key update module can wait for the next execution interval to check for changes in its keys.

If, at 604, it is determined that there is a change to a key, then, at 608, the new key(s) may be obtained from the keys table. In this case, since the key update module on the node determines that there is a change to at least one key defined for the node in the keys table (e.g., there is at least one new key defined for the node in the keys table), the key update module can obtain the new key(s) from the keys table. The key update module on the node may use the unique identifier of the node to securely access and obtain from the keys table the new key(s) defined for the node.

At 610, a secure communication configuration file may be updated. For example, the key update module on the node can update a secure communication configuration file (e.g., an IPSec configuration file) on the node with the new key(s) obtained from the keys table.

At 612, the secure communication configuration file with the updated key(s) may be loaded to a security process on the node. For example, the key update module on the node can load the updated secure communication configuration file that includes the new key(s) obtained from the keys table to a security process on the node. Once the updated secure communication configuration file including the new key(s) is loaded, the security process on the node can start using the new key(s) along with any existing key (e.g., the non-changed keys) to provide the secure communication framework.

FIG. 7 is a block diagram illustrating selective components of an example computing device 700 in which various aspects of the disclosure may be implemented, in accordance with an embodiment of the present disclosure. For example, illustrative computing device 700 can perform all or part of the processes described herein. As shown, computing device 700 includes one or more processors 702, a volatile memory 704 (e.g., random access memory (RAM)), a non-volatile memory 706, a user interface (UI) 708, one or more communications interfaces 710, and a communications bus 712.

Non-volatile memory 706 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 708 may include a graphical user interface (GUI) 714 (e.g., a touchscreen, a display, etc.) and one or more input/output (I/O) devices 716 (e.g., a mouse, a keyboard, a microphone, one or more speakers, one or more cameras, one or more biometric scanners, one or more environmental sensors, and one or more accelerometers, etc.).

Non-volatile memory 706 stores an operating system 718, one or more applications 720, and data 722 such that, for example, computer instructions of operating system 718 and/or applications 720 are executed by processor(s) 702 out of volatile memory 704. In one example, computer instructions of operating system 718 and/or applications 720 are executed by processor(s) 702 out of volatile memory 704 to perform all or part of the processes described herein (e.g., processes illustrated and described with reference to FIGS. 1 through 6). In some embodiments, volatile memory 704 may include one or more types of RAM and/or a cache memory that may offer a faster response time than a main memory. Data may be entered using an input device of GUI 714 or received from I/O device(s) 716. Various elements of computing device 700 may communicate via communications bus 712.

The illustrated computing device 700 is shown merely as an illustrative client device or server and may be implemented by any computing or processing environment with any type of machine or set of machines that may have suitable hardware and/or software capable of operating as described herein.

Processor(s) 702 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 702 may be analog, digital, or mixed signal. In some embodiments, processor 702 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 710 may include one or more interfaces to enable computing device 700 to access a computer network such as a Local Area Network (LAN), a Wide Area Network (WAN), a Personal Area Network (PAN), or the Internet through a variety of wired and/or wireless connections, including cellular connections.

In described embodiments, computing device 700 may execute an application on behalf of a user of a client device. For example, computing device 700 may execute one or more virtual machines managed by a hypervisor. Each virtual machine may provide an execution session within which applications execute on behalf of a user or a client device, such as a hosted desktop session. Computing device 700 may also execute a terminal services session to provide a hosted desktop environment. Computing device 700 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   performing, during boot up of a node of a cluster, a check to determine whether the node is a first node of the cluster, the first node being a controller node; and
   responsive to a determination, by the node, that the node is a first node of the cluster:
   generating, by the first node, a first key for intra-cluster communication;
   updating, by the first node, a keys table with the generated first key;
   generating, by the first node, a secure communication configuration file on the first node, wherein the secure communication configuration file includes the first key;
   loading, by the first node, the secure communication configuration file including the first key to a security process on the first node;
   determining, by the first node, whether a key exists for an inter-cluster communication with another node of another cluster; and
   responsive to a determination that a key does not exist for the inter-cluster:
   communication with the another node of the another cluster:

generating, by the first node, a second key for the inter-cluster communication with the another node of the another cluster;

updating, by the first node, the keys table with the generated second key;

updating, by the first node, the secure communication configuration file on the first node to include the second key; and loading, by the first node, the secure communication configuration file updated with the second key to the security process on the first node.

2. The method of claim 1, wherein the security process on the first node utilizes Internet Protocol Security (IPSec).

3. The method of claim 2, wherein the secure communication configuration file on the first node is an IPSec configuration file.

4. The method of claim 1, further comprising:

responsive to a determination, by the node of the cluster, that the node is a subsequent node following the first node of the cluster:

obtaining, by the subsequent node, one or more keys from the keys table based on an identifier of the subsequent node;

generating, by the subsequent node, a secure communication configuration file on the subsequent node, wherein the secure communication configuration file includes the one or more keys from the keys table; and loading, by the subsequent node, the secure communication configuration file including the one or more keys from the keys table to a security process on the subsequent node.

5. The method of claim 4, wherein the security process on the subsequent node utilizes IPSec.

6. The method of claim 5, wherein the secure communication configuration file on the subsequent node is an IPSec configuration file.

7. The method of claim 1, wherein the keys table is provided on a server remote from the cluster.

8. The method of claim 1, further comprising:

responsive to a determination, by the node of the cluster, that there is a new key in the keys table:

obtaining, by the node, the new key from the keys table based on an identifier of the node;

updating, by the node, a secure communication configuration file with the new key from the keys table; and loading, by the node, the secure communication configuration file including the new key from the keys table to a security process on the node.

9. A system comprising:

one or more non-transitory machine-readable mediums configured to store instructions; and one or more processors configured to execute the instructions stored on the one or more non-transitory machine-readable mediums, wherein execution of the instructions causes the one or more processors to carry out a process comprising:

performing, during boot up of a node of a cluster, a check to determine whether the node is a first node of the cluster, the first node being a controller node; and responsive to a determination, by the first node, that the node is a first node of the cluster:

generating, by the first node, a first key for intra-cluster communication;

updating, by the first node, a keys table with the generated first key;

generating, by the first node, a secure communication configuration file on the first node, wherein the secure communication configuration file includes the first key;

loading, by the first node, the secure communication configuration file including the first key to a security process on the first node, determining, by the first node, whether a key exists for an inter-cluster communication with another node of another cluster; and responsive to a determination that a key does not exist for the inter-cluster:

communication with the another node of the another cluster:

generating, by the first node, a second key for the inter-cluster communication with the another node of the another cluster;

updating, by the first node, the keys table with the generated second key;

updating, by the first node, the secure communication configuration file on the first node to include the second key; and loading, by the first node, the secure communication configuration file updated with the second key to the security process on the first node.

10. The system of claim 9, wherein the secure communication configuration file on the first node is an IPSec configuration file.

11. The system of claim 9, wherein the process further comprises:

responsive to a determination, by the node of the cluster, that the node is a subsequent node following the first node of the cluster:

obtaining, by the subsequent node, one or more keys from the keys table based on an identifier of the subsequent node;

generating, by the subsequent node, a secure communication configuration file on the subsequent node, wherein the secure communication configuration file includes the one or more keys from the keys table; and loading, by the subsequent node, the secure communication configuration file including the one or more keys from the keys table to a security process on the subsequent node.

12. The system of claim 11, wherein the secure communication configuration file on the subsequent node is an IPSec configuration file.

13. The system of claim 9, wherein the keys table is provided on a server remote from the cluster.

14. The system of claim 9, wherein the process further comprises:

responsive to a determination, by the node of the cluster, that there is a new key in the keys table:

obtaining, by the node, the new key from the keys table based on an identifier of the node;

updating, by the node, a secure communication configuration file with the new key from the keys table; and loading, by the node, the secure communication configuration file including the new key from the keys table to a security process on the node.

15. A non-transitory machine-readable medium encoding instructions that when executed by one or more processors cause a process to be carried out, the process including:

performing, during boot up of a node of a cluster, a check to determine whether the node is a first node of the cluster, the first node being a controller node; and responsive to a determination, by the node, that the node is a first node of the cluster:
- generating, by the first node, a first key for intra-cluster communication;
- updating, by the first node, a keys table with the generated first key;
- generating, by the first node, a secure communication configuration file on the first node, wherein the secure communication configuration file includes the first key;
- loading, by the first node, the secure communication configuration file including the first key to a security process on the first node,
- determining, by the first node, whether a key exists for an inter-cluster communication with another node of another cluster; and
- responsive to a determination that a key does not exist for the inter-cluster:
  - communication with the another node of the another cluster:
    - generating, by the first node, a second key for the inter-cluster communication with the another node of the another cluster;
    - updating, by the first node, the keys table with the generated second key;
    - updating, by the first node, the secure communication configuration file on the first node to include the second key; and
    - loading, by the first node, the secure communication configuration file updated with the second key to the security process on the first node.

16. The machine-readable medium of claim 15, wherein the process further comprises:
responsive to a determination, by the node of the cluster, that the node is a subsequent node following the first node of the cluster:
- obtaining, by the subsequent node, one or more keys from the keys table based on an identifier of the subsequent node;
- generating, by the subsequent node, a secure communication configuration file on the subsequent node, wherein the secure communication configuration file includes the one or more keys from the keys table; and
- loading, by the subsequent node, the secure communication configuration file including the one or more keys from the keys table to a security process on the subsequent node.

17. The machine-readable medium of claim 15, wherein the process further comprises:
responsive to a determination, by the node of the cluster, that there is a new key in the keys table:
- obtaining, by the node, the new key from the keys table based on an identifier of the node;
- updating, by the node, a secure communication configuration file with the new key from the keys table; and
- loading, by the node, the secure communication configuration file including the new key from the keys table to a security process on the node.

\* \* \* \* \*